(12) United States Patent
Tonuzi

(10) Patent No.: US 6,422,176 B1
(45) Date of Patent: Jul. 23, 2002

(54) GUIDE ROPE FOR SMALL CHILDREN

(76) Inventor: Mirvetk Tonuzi, 290 Ridge St., New Milford, NJ (US) 07646

( * ) Notice: Subject to any disclaimer, the term of this patent is extended or adjusted under 35 U.S.C. 154(b) by 0 days.

(21) Appl. No.: 09/682,527

(22) Filed: Sep. 14, 2001

(51) Int. Cl.$^7$ ............................................. A01K 27/00
(52) U.S. Cl. ...................................... 119/770; 770/769
(58) Field of Search ................................ 119/770, 769, 119/712

(56) References Cited

U.S. PATENT DOCUMENTS

| | | | |
|---|---|---|---|
| 3,563,208 A | * 2/1971 | Nero | 119/96 |
| 4,667,624 A | * 5/1987 | Smith | 119/96 |
| 5,351,654 A | * 10/1994 | Fuentes | 119/770 |
| 5,950,569 A | * 9/1999 | Perrulli | 119/770 |

* cited by examiner

Primary Examiner—Peter M. Poon
Assistant Examiner—Joan Olszewski
(74) Attorney, Agent, or Firm—Richard A Joel, Esq.

(57) ABSTRACT

A rope guide or escort safety lines for small children wherein the children grasp a handle attached to a main rope to prevent the children from straying or getting lost. The guide rope comprises a central main nylon rope with a plurality of intermediate cross ropes with end handles for gripping. The cross-ropes are located at spaced positions on the main rope. A team leader position is located at the forward portion of the main rope and includes an adjustable belt-like element which fastens about the waist of the team leader. A supervisor handle is located at the end of the main rope to be gripped by the adult responsible for the small children who grasp the handles on the cross-ropes. Decorative signs may be hung from the main rope to enhance the design for children.

2 Claims, 3 Drawing Sheets

GUIDE ROPE FOR SMALL CHILDREN

BACKGROUND OF THE INVENTION

This invention relates to guide ropes or escort safety lines for small children wherein the children grasp a handle attached to a main rope to prevent the children from straying or getting lost.

In the prior art, children have been tethered to ropes to keeps them from getting lost particularly in crowds. Safety harnesses such as shown in DES. Patent 383,256 to Hampton have been used to secure children to a supervising adult. The following patents represent the status of the prior art over which the present invention is a patentable improvement.

U.S. Pat. No. 4,638,764 to Anderson discloses a security system for securing a small child to an adult comprising a wrist loop which is attached at one end to a child and at its other end to an adult.

U.S. Pat. No. 5,423,292 to Hall discloses a safety harness for children with Velcro® or hook and loop fasteners securing a child's wrist to a connection strap.

U.S. Pat. 5,447,121 to Spence discloses an escort safety line for children which is non-tethering and non restraining.

Other patents of interest include U.S. Pat. No. 4,765,279 to Klickstein, U.S. Pat. No. 5,351,654 to Fuentes and U.S. Pat. No. 6,047,665 to Deveaux.

The present disclosure relates to a child friendly safety rope which is inexpensive, easy to use and effective. The leader and supervisory positions located at opposite ends of the rope permit control over the children who grasp intermediate cross member handles. Decorations may hang from the rope to give the impression of a group of elephants moving in line or a train with several cars pulled by a locomotive.

SUMMARY OF THE INVENTION

This invention relates to a rope guide which is used to escort small children. The guide rope comprises a central main nylon rope with a plurality of intermediate cross ropes with end handles. The cross-ropes are located at spaced positions on the main rope. A team leader position is located at the forward portion of the main rope and includes an adjustable belt-like element which fastens about the waist of the team leader. A supervisor handle is located at the end of the main rope to be gripped by the adult responsible for the small children who grasp the handles on the cross-ropes. Decorative signs or appliqués may be hung from the main rope to enhance the design for children. Generally the guide rope, called a TUGLER™, is used for a group of 5 small children ages 3–8.

Accordingly, an object of this invention is to provide a new and improved guide rope to escort small children while promoting team togetherness and safety.

Another object of this invention is to provide a new and improved guide rope to protect a group of small children which includes a group leader position at one end, intermediate handles for the children and a supervisor's handle at the other end.

A further object of this invention is to provide a new and improved rope guide for small children which includes a central rope with a belt at the forward or leader end and a supervisor's handle at the other end and intermediate children's handles at the end of cross-ropes.

A more specific object of this invention is to provide a new and improved guide rope for small children which includes a central guide rope, an adjustable leader belt at the forward end, a supervisor's handle at the other end and spaced cross ropes with handles at each end which are slideable on the main rope for predetermined distances, and decorative pictures which may be connected to the main rope with the use of different colored nylon rope and appliqués further team association for example: blue elephants; yellow elephants.

BRIEF DESCRIPTION OF THE DRAWINGS

The above and other objects and advantages of this invention may be more clearly seen when viewed in conjunction with the accompanying drawings wherein.

FIG. 4 i s a perspective view of the supervisor's handle; and.

DETAILED DESCRIPTION

Figure 1:
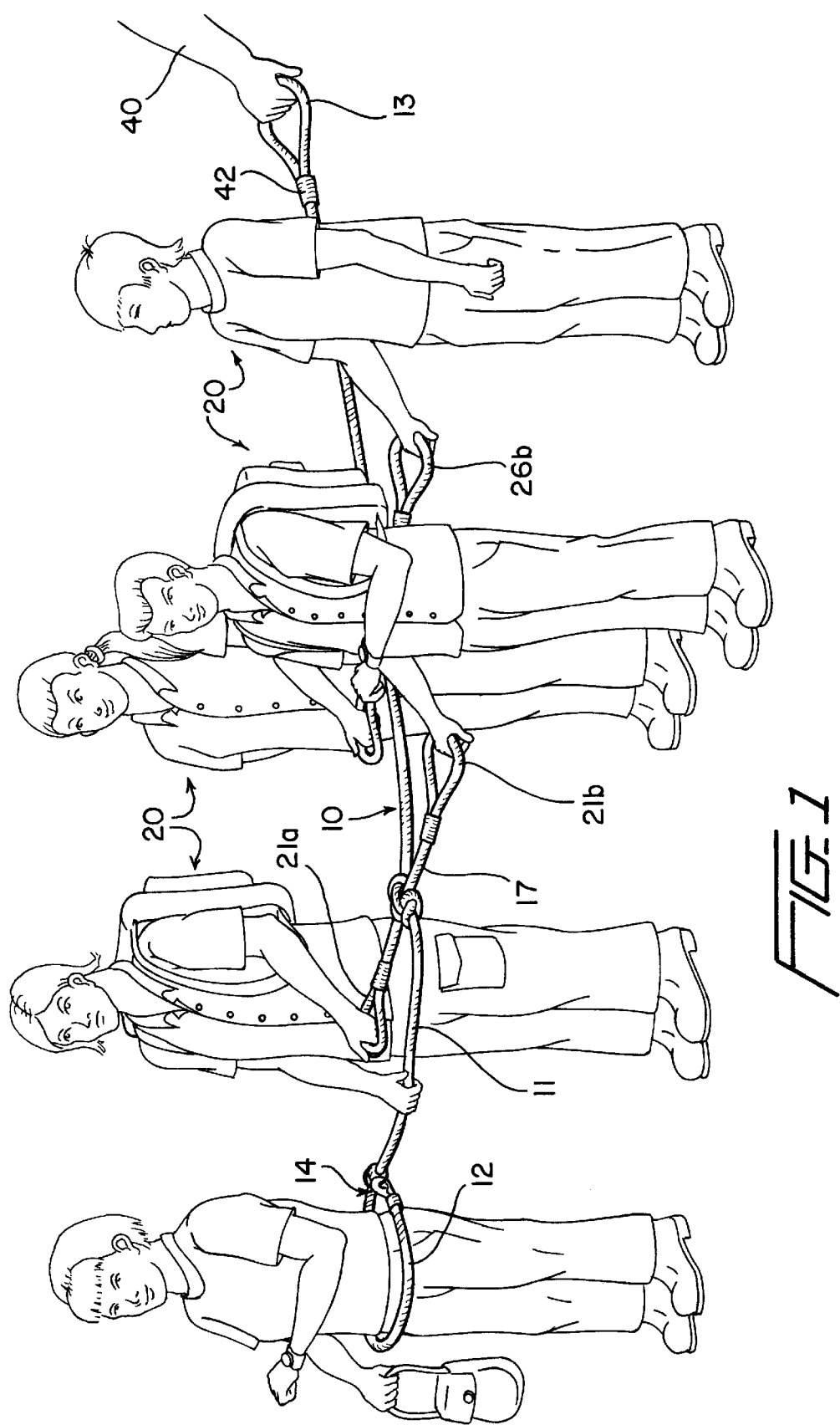
FIG. 1 is a perspective view of the invention in use.

Referring now to the FIG. 1 of the drawings, the guide rope or escort rope 10 for children includes a nylon main rope 11 having a leader belt 12 at its forward end and a supervisor handle 13 at its rear end. The belt 12 includes a plastic snap hook or latch 14 at its outer end and various spaced links 16a–c along the forward end of the rope 11. The snap hook 14 includes a forward hook like portion 31 with a slideable lock 32 and a rear loop 33 which is connected to the rope loop 33 by use of waxed linen thread and covered with elastic wrap 34 from decorative appeal. The snap hook 14 engages an appropriate link or plastic ring 15a–c to secure the belt 12 about the team leader 50. The links or loops 15a–c are held in place on the rope 11 by knots 16a–c in the main rope 11. The leader belt 12 is shown in FIG. 5 and the supervisor handle 13 is shown in FIG. 4.

Figure 3:
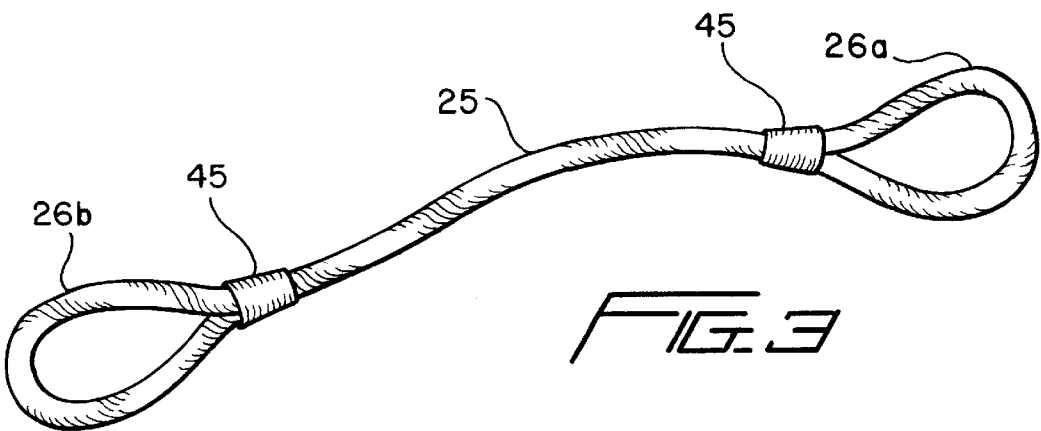
FIG. 3 is a perspective view of a cross-rope.

The escort rope 10 also includes a first cross-member or rope 17, shown in FIG. 3 which is secured to rope 11 by a knot 18 at a central point. The knot 18 may be slideable along the rope 11 between knots 19a and 19b, which act as stops or it may be firmly affixed thereto. A handle 21a and 21b is formed on each end of the cross-rope 17 as the cross-rope 17 is sewn securely with waxed linen thread in a loop and covered with elastic wrap 45 for decorative purposes. The handles 21a, 21b include an aperture 35a–b, which is small enough to prevent choking a small child and facilitate access for holding purposes. In use, a child 20 would grip a handle 21a or 21b. The absence of a child 20 from one end of the cross-rope 17 would be quickly noticed.

Figure 2:
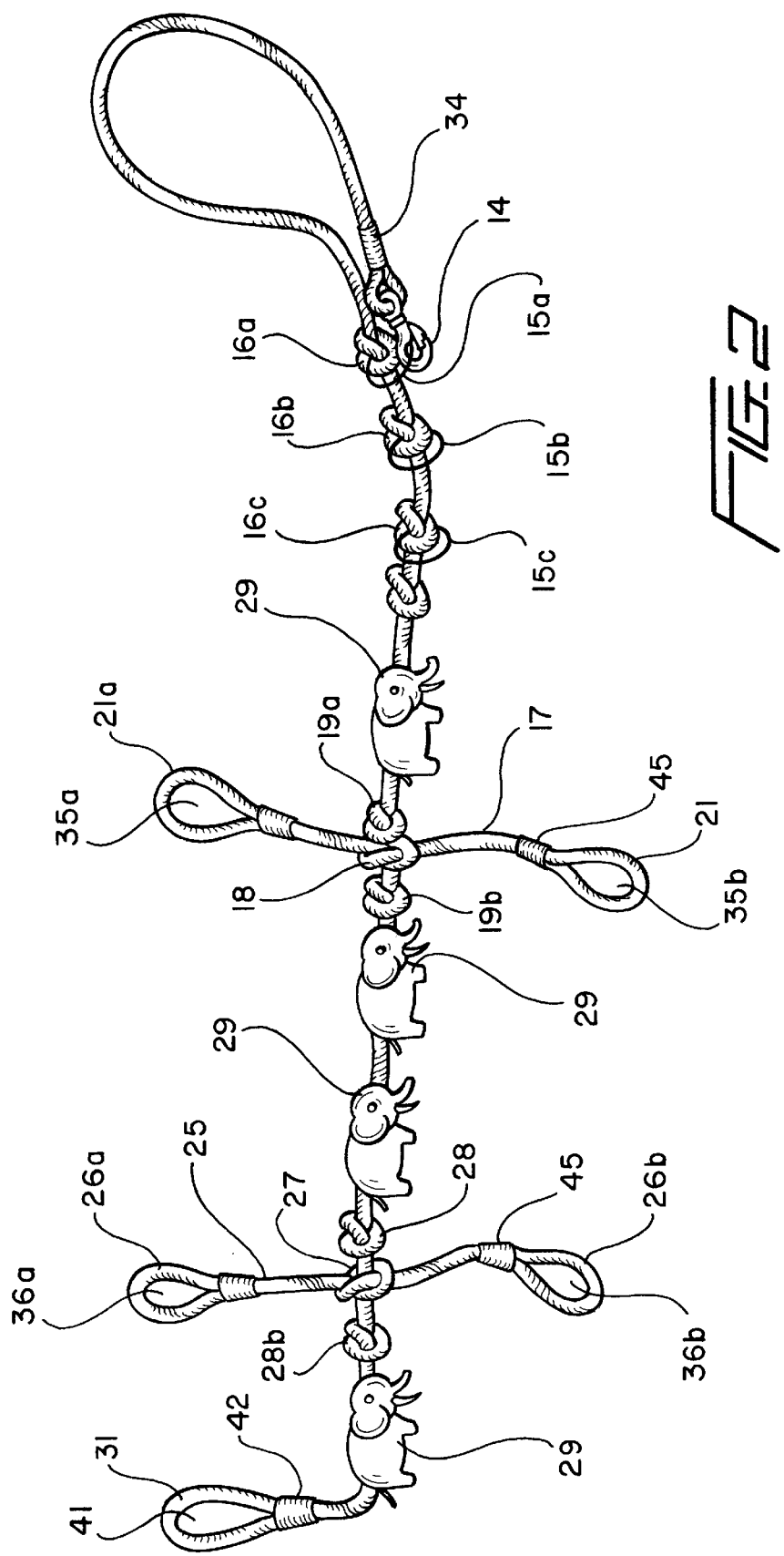
FIG. 2 is a perspective view of the invention.

The cross-rope 25 is similar to cross-rope 17 shown in FIG. 3 and is spaced therefrom. Handles 26a and 26b with apertures 36a and 36b are situated on opposite sides of the rope 11 and are slidably secured there by knot 27 between stops 28a and 28b. A picture or applique 29 for example on a plastic sheet (see FIG. 2) may be connected to the rope 11 between the cross-members 17 and 25 and draped downwardly therefrom. The picture 29 may also be connected at the front and rear of the rope 10. The picture 29 could represent an elephant (as shown in the drawings) or a train, either of which would appear appropriate in the grouping of children with the escort rope 10. Other themes can be incorporated such as shapes, animals, bees, etc. and various colors used as well.

Figure 4:
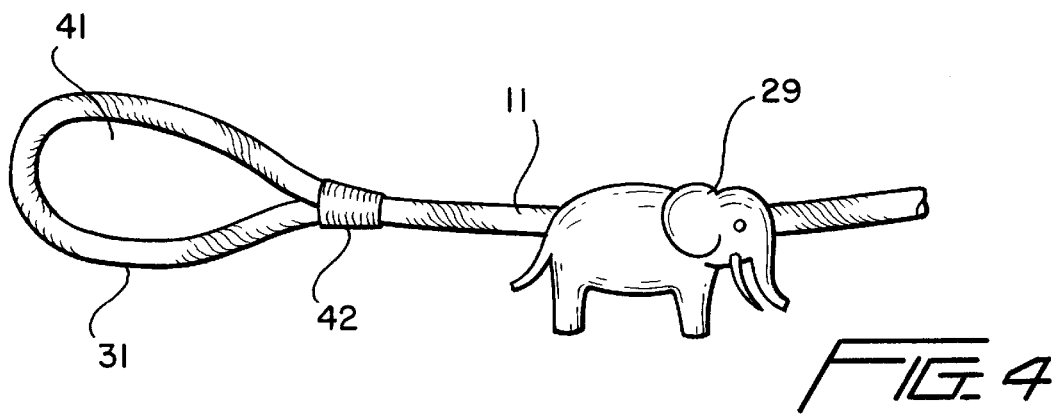
Figure 5:
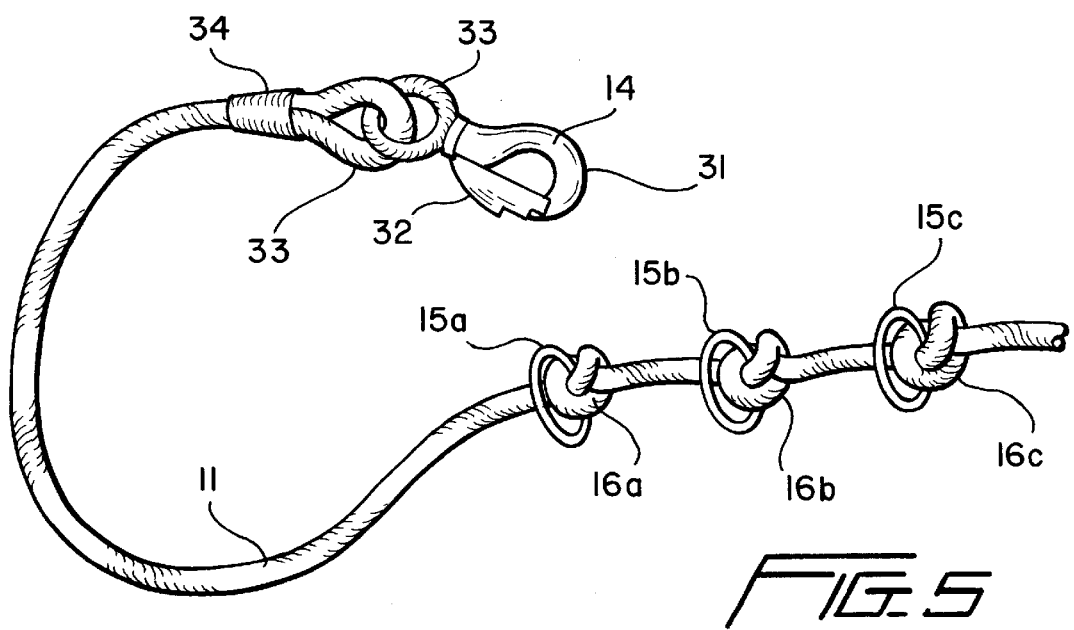
FIG. 5 is a perspective view of the group leader's coupling belt.

A supervisor's handle 13 is located at the end of the rope 10 for an adult 40 to grasp and monitor a group of 5 children, see FIG. 4. Cross members 17 and 25 are fixed at two per escort line 10. The general age range of the children is from 3 to 8 years old. The handle 13 comprises a loop in the main rope 11, which is banded to the rope 11 by coupling 42 leaving an aperture 41 for gripping purposes.

The guide rope 10 is inexpensive since it essentially comprises a single rope 11 with separate cross ropes 17 and 25 knotted thereto. Waxed line thread, plastic "O" rings, 15a–c, elastic wraps 34, 42, 45 and hook 14 are the only additional elements. The rope 10 is easy to assemble, attractive and functional.

While the invention has been explained by a detailed description of certain specific embodiments, it is understood that various modifications and substitutions can be made in any of them within the scope of the appended claims which are intended also to include equivalents of such embodiments.

What is claimed is:

1. A guide rope for small children having an adult supervisor comprises:

an elongated nylon main rope having a first pair of spaced knots and a second pair of spaced knots;

a supervisor handle at one end of said main rope;

an adjustable leader belt at the other end of said rope for fastening about a small child;

a first cross-member rope slidably mounted to the main rope at a first intermediate point between the first pair of spaced knots, said cross-member rope having a handle at each end for gripping by a child;

a second cross-member rope spaced from the first cross-member and slidably mounted to the main rope at a second Intermediate point between the second pair of spaced knots and having a handle at each end for gripping by a child; and picture means mounted to the rope between the cross-members and adjacent the leader belt and supervisor handle and hanging downwardly therefrom.

2. A guide rope for small children in accordance with claim wherein:

the leader belt at the end of said rope comprises a locking hook mounted at the end thereof and a plurality of spaced loops comprising spaced plastic "O" rings along the main rope to be engaged by the hook; and, a plurality of spaced knots in the rope separating the loops with a knot on each side of a loop to provide an adjustment for the leader belt.

* * * * *